US006824192B2

(12) United States Patent
Hoffmann

(10) Patent No.: US 6,824,192 B2
(45) Date of Patent: Nov. 30, 2004

(54) TRUCK TOP FRAME

(76) Inventor: Robert T. Hoffmann, 1806 W. Second St., Wichita, KS (US) 67201

( * ) Notice: Subject to any disclaimer, the term of this patent is extended or adjusted under 35 U.S.C. 154(b) by 0 days.

(21) Appl. No.: 10/413,884

(22) Filed: Apr. 15, 2003

(65) Prior Publication Data

US 2004/0207231 A1 Oct. 21, 2004

(51) Int. Cl.$^7$ .................................................. B60P 7/02
(52) U.S. Cl. ................................. 296/100.18; 296/102
(58) Field of Search ................... 296/100.17, 100.08, 296/4, 43, 102; 224/309, 310, 315, 317, 320, 321, 322, 325

(56) References Cited

U.S. PATENT DOCUMENTS

| | | | |
|---|---|---|---|
| 2,692,795 A | | 10/1954 | Lander |
| 3,901,548 A | * | 8/1975 | Seaman, Jr. ............ 296/100.18 |
| 4,211,448 A | * | 7/1980 | Weston ........................... 296/3 |
| 4,381,123 A | * | 4/1983 | Anderson ..................... 296/43 |
| 4,709,956 A | * | 12/1987 | Bowman ............... 296/100.18 |
| 4,813,734 A | * | 3/1989 | Hoover ................... 296/100.17 |
| 4,900,058 A | | 2/1990 | Hobrecht |
| 4,915,440 A | | 4/1990 | Daniel et al. |
| 5,143,415 A | * | 9/1992 | Boudah ......................... 296/3 |
| 5,186,513 A | | 2/1993 | Strother |
| 5,299,849 A | * | 4/1994 | Cook et al. ............ 296/100.18 |
| 5,353,826 A | | 10/1994 | Davis, Sr. |
| 5,423,587 A | * | 6/1995 | Ingram .................. 296/100.18 |
| 6,186,571 B1 | * | 2/2001 | Burke ........................... 296/3 |
| 6,439,646 B1 | * | 8/2002 | Cornelius .............. 296/100.18 |

* cited by examiner

Primary Examiner—Lori L. Coletta
(74) Attorney, Agent, or Firm—Edward L. Brown

(57) ABSTRACT

A truck top frame for supporting a fabric cover including two or more bows mounted in truck stake pockets. Each bow having a plurality of nipples mounted thereon facing adjacent bows. Multiple purlins are supported by the bows by a pair of facing nipples. The bows comprise three sections including two vertical sections, a horizontal section and two non-rotating sliding joints therebetween. Each vertical section including a transitional section and its upper end and the horizontal section includes a transitional section at each end thereof. The transitional sections on the horizontal section join the transitional sections on the vertical section in a parallel telescoping relation in two non-rotating joints.

8 Claims, 4 Drawing Sheets

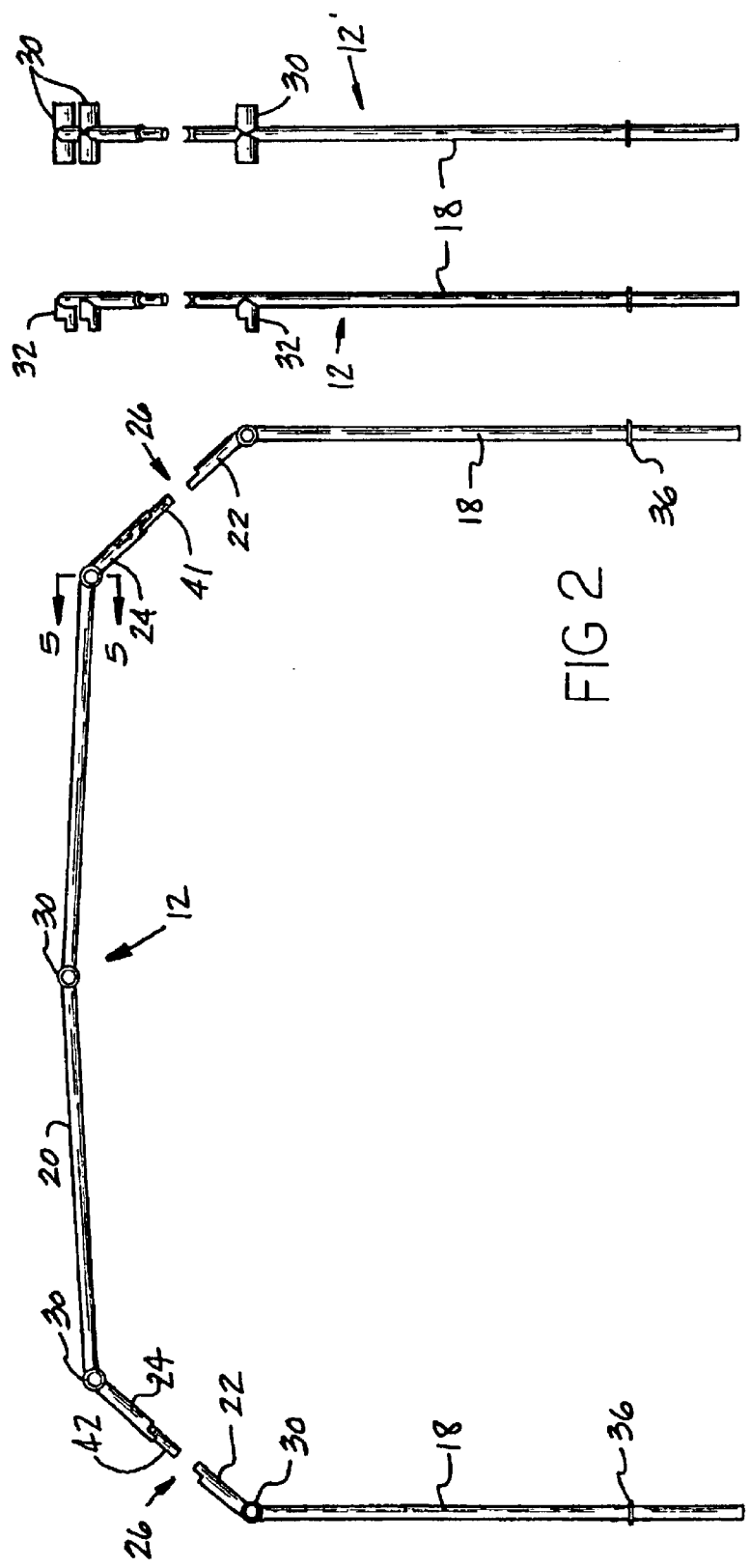

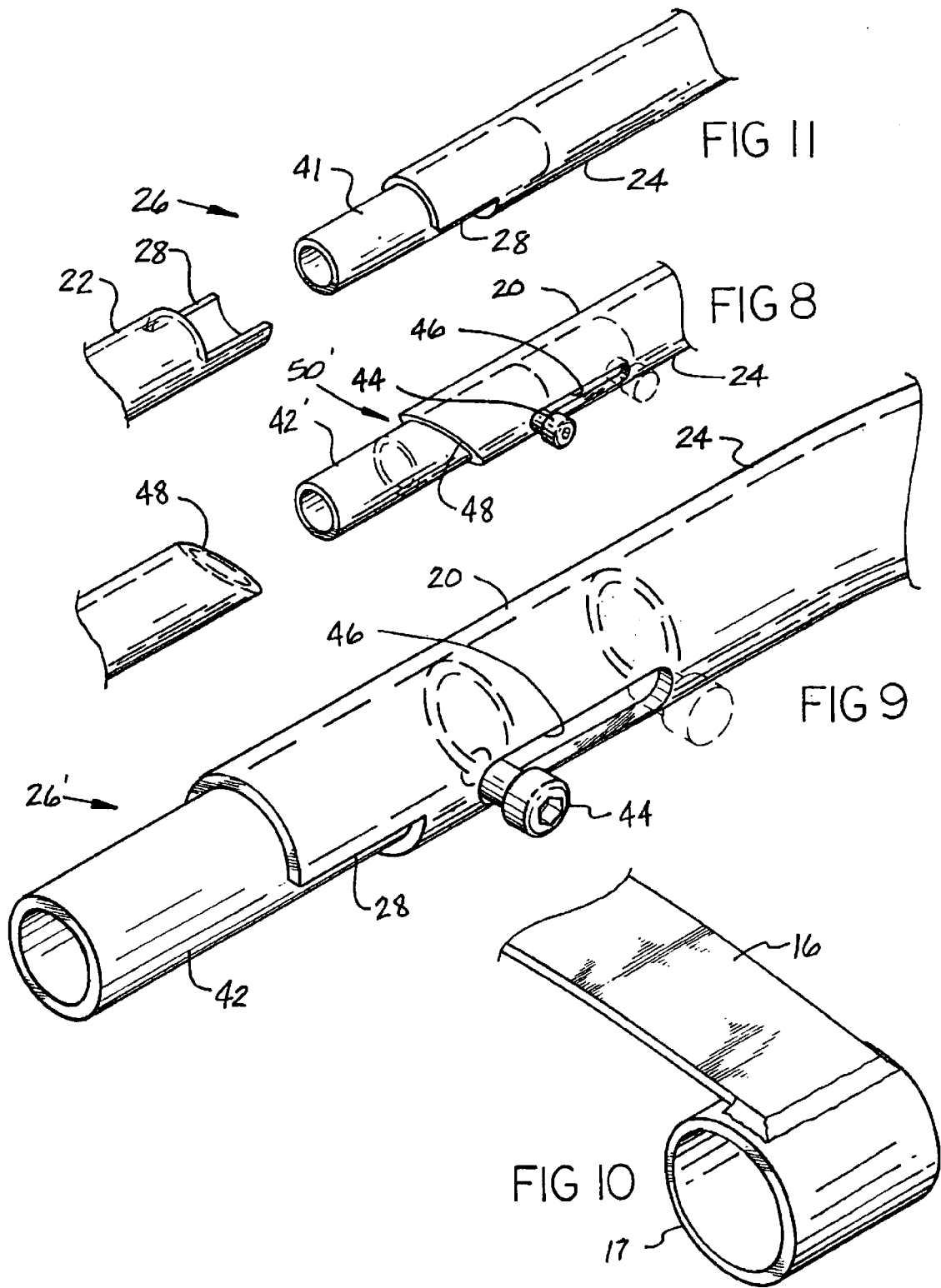

TRUCK TOP FRAME

BACKGROUND OF THE INVENTION

The invention relates to a removable truck top frame for military vehicles, referred to as the Family of Medium Tactical Vehicles (FMTV's). The purpose of the frame is to support a tarpaulin or other fabric cover or top on the cargo portion or bed of a truck. Military trucks require versatility for transporting equipment as well as troops. In either case, it is common practice to shield the troops or cargo from wind and weather by means of canvas covers stretched over metal bows or frames which are detachably mounted on the side walls of the truck bed.

DESCRIPTION OF PRIOR ART

The general concept of a removable canvas top truck supported by a tubular frame is old in the art, as exemplified in the patents to Lander, U.S. Pat. No. 2,692,795, which teaches a somewhat similar tubular frame structure breaking down bows 20 with uprights 15 by hinges 17 and is incapable of inserting the upright members in their stake pockets separately.

The patent to Davis, U.S. Pat. No. 5,353,826, breaks the bows down into two pieces rather than three and does not use conventional stake pockets in the truck bed. The patent to Strother, U.S. Pat. No. 5,186,513, breaks bows down into five pieces rather than three and also does not use stake pockets.

SUMMARY OF THE INVENTION

The present design is for a family of military trucks, with different sizes and configurations, that are known collectively as the "FMTV's". The truck cover is a canvas covering which goes over the cargo bed area of the truck. The skeletal tubular steel structure upon which the cover is placed consists of a plurality of longitudinal spaced bows supporting a series of purlins between each bow. The bows span the truck cargo bed from side to side. One is located in the front of the bed, one at the rear and either one or two in between, thus having two or three bays between the bows. There are a series of rafters supported by the purlins running parallel to the bows and therebetween. As the vertical sides of the bow extend to the top of the bow there is a transitional section positioned at approximately 45 degrees to both the vertical and horizontal sections of the bow. The assembled bows weigh 30 pounds each and are over five feet tall at the center and approximately seven-and-one-half feet wide. In order to lift a bow, the normal method is to grab the bow at its center and raise it overhead. The stake pockets within which the ends of the bows have to be inserted are located along the edges of the sides of the truck bed. Unfortunately the holes are outboard of the side panel of the truck bed and are therefore not visible from the center of the truck bed. It is near impossible for a single installer to thread the ends of the bows into their respective pockets which sometimes cannot be seen. Even if possible for the installer to be fortunate enough to insert one of the bow ends into its pocket without actually seeing the hole, it would be impossible to insert the other end of the bow into the hole on the opposite side of the truck bed since the opposite bow end is already inserted approximately 6 inches into its hole and it would be difficult to bend the uninstalled end of the bow upward and inward sufficiently enough to permit it to engage and align with its hole. The result is the bows require two individuals to install them on the truck bed, one on each end of the bow, and they must install their respective ends into the holes at the same time so the vertical sections of the bow do not cock and bind in the holes.

Each of the bows of the present invention can be installed by a single person and they do not have the above-mentioned problems. Each bow is comprised of three separate sections, a horizontal section and two vertical sections. The horizontal section has transitional sections on both ends. The two vertical sections also have a transitional section at the upper end thereof. The vertical sections of the bows are inserted one at a time with the ends of each bow positioned in their respective pockets located on opposite sides of the truck bed.

The horizontal section is axially aligned to engage the mating joint on the upper end of one vertical section. The joint at the opposite end of the horizontal section engages the other vertical section by retracting the sliding male pin and aligning that male pin with the upper end of the opposite transitional section whereby the sliding pin may be extended into that section creating an assembled bow with non-rotating joints between sections of the bows.

It is therefore the principal object of the invention to provide a truck top tubular frame structure which can be assembled or disassembled by a single person.

Another object of the present invention is to provide a truck top frame structure which breaks down into a minimal package size for shipment when not in use.

A further object of the present invention is to provide a series of joints in a truck top frame wherein the purlins between the bows can be inserted in place without the danger of other purlins already in place, falling as the bows are spread.

BRIEF DESCRIPTION OF THE DRAWINGS

FIG. 2 is a front elevational view of the three sections of a bow separated from each other but axially aligned for assembly;

FIG. 3 is a side elevational view of the sections of an end bow with the sections separated;

FIG. 4 is a side elevational view of a center bow with the sections separated;

FIG. 5 is a longitudinal section to an enlarged scale of a purlin support nipple taken along line 5—5 of FIG. 2;

FIG. 6 is a longitudinal sectional view to an enlarged scale similar to FIG. 5 of the purlin support nipples located on the center bow;

FIG. 7 is a longitudinal sectional view to an enlarged scale of a purlin support nipple in an alternate configuration;

FIG. 8 is a perspective view of a modified form of bow joint between sections wherein the sliding pin is illustrated in extended and retracted positions;

FIG. 9 is a perspective view to an enlarged scale of the slideable pin joint with the pin shown in its extended and retracted positions;

FIG. 10 is a perspective view to an enlarged scale of the end portion of a rafter;

FIG. 11 is a perspective view to an enlarged scale of the fixed pin joint with a notched cut.

DETAILED DESCRIPTION OF THE PREFERRED EMBODIMENT

Figure 1:
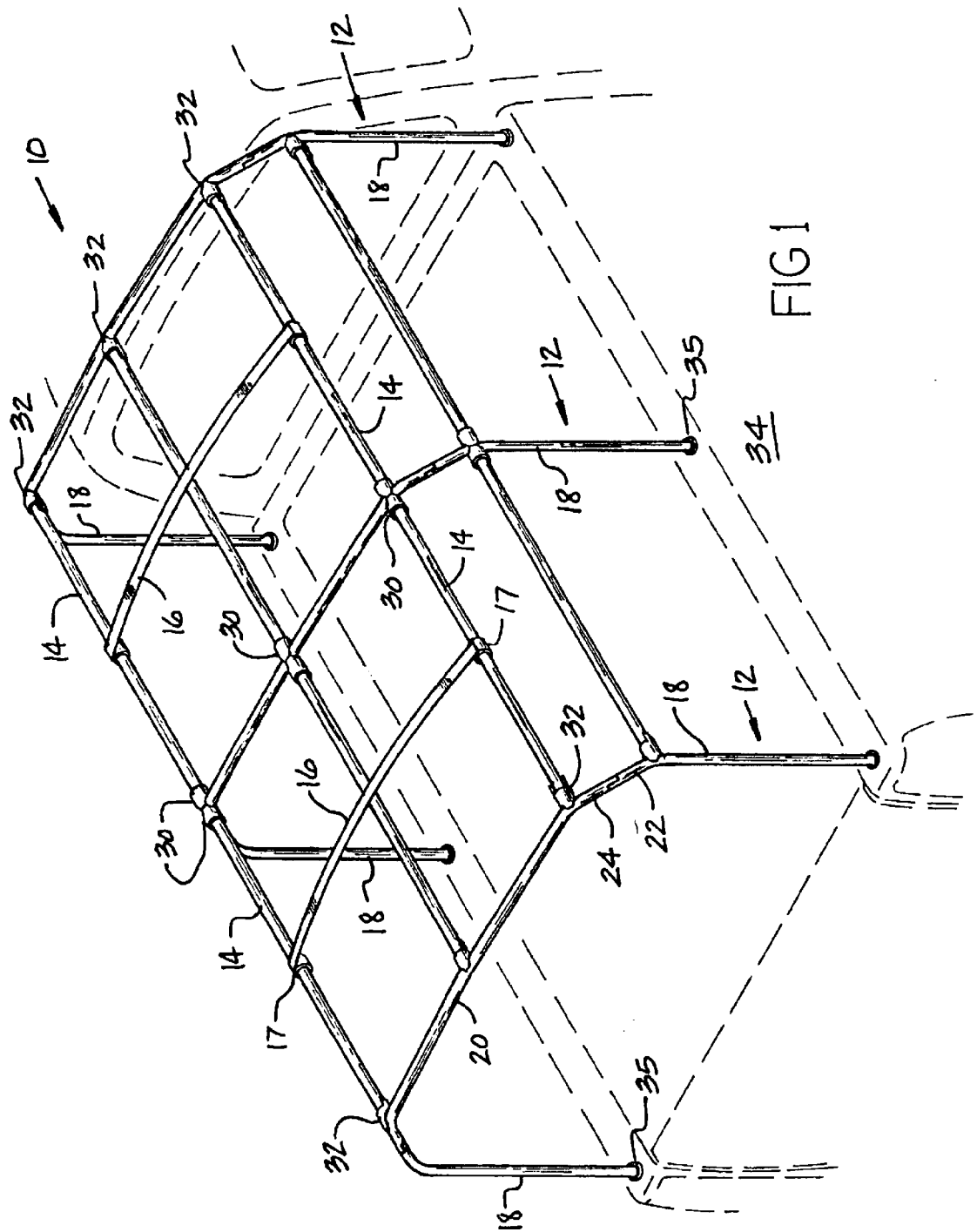
FIG. 1 is a perspective view of the truck top tubular frame of the present invention in its assembled form in the stake pockets of a truck bed.

The truck top frame of the present invention is generally identified by reference numeral 10 as seen in FIG. 1. The frame 10 includes a series of two end-bow sections 12 with one center section 12'. In larger and smaller trucks, there could be either four bow sections or two in the case of a smaller truck size.

Each bow 12 breaks down into three parts, a horizontal section 20 and two vertical sections 18, as best seen in FIG. 2. The vertical sections 18 include a transitional section 22 which terminates in a non-rotating telescoping joint 26. The horizontal section 20 in the bow also includes a transitional section 24 at each end thereof which terminates in a mating, non-rotating joint 26 or 26'. The bottom end of vertical section 18 includes a washer 36 welded in place which limits the downward movement in the stake pocket 35. Pocket 35 is integral with the truck bed 34 and its side panels 38.

FIG. 11 illustrates joint 26 wherein a fixed pin 41 of lesser diameter is welded inside transitional section 24. The O.D. of fixed pin 41 slideably fits within the I.D. of transitional section 22. Both sections 22 and 24 have notched out mating cuts 28 which mate when the joint is fully engaged, thereby preventing any rotation of the joint.

The non-rotating joint 26' on the opposite end of horizontal section 20 has a sliding pin 42, as seen in FIG. 9, in contrast with fixed pin 41 of FIG. 11. Sliding pin 42, while shown fully extended in FIG. 9, can be retracted fully within transitional section 24, as shown in dotted line in FIG. 9. Since the vertical sections of the bows 18 are positioned in their respective stake pockets 35, there is very little tolerance when attempting to engage the second joint 26'. This problem is solved in joint 26' by retracting pin 42 to its retracted position whereby the notched sections can be readily aligned with each other without separating the sections longitudinally. Once aligned, sliding pin 42 can be extended to its full line position, as seen in FIG. 9, whereby the non-rotating joint 26' is fully engaged. If sliding pin 42 could not be retracted for assembly, the two sections would have to be pulled apart to clear the end of pin 42 whereupon section 22 and pin 41 would be out of axial alignment and could not be assembled.

FIG. 8 illustrates a modified form of non-rotating joint 50' wherein both members 22 and 24 of the joint have a slanted cut end surface 48 rather than the notched cut 28, as shown in FIG. 11. The modified form joint 50 on the opposite end of horizontal section 20 is not shown in the drawing. However, it would have a similar structure to that of FIG. 11 wherein the pin 41 would be stationary, as shown in FIG. 11, with mating slanted cut ends 48, as shown in FIG. 8.

Figure 12:
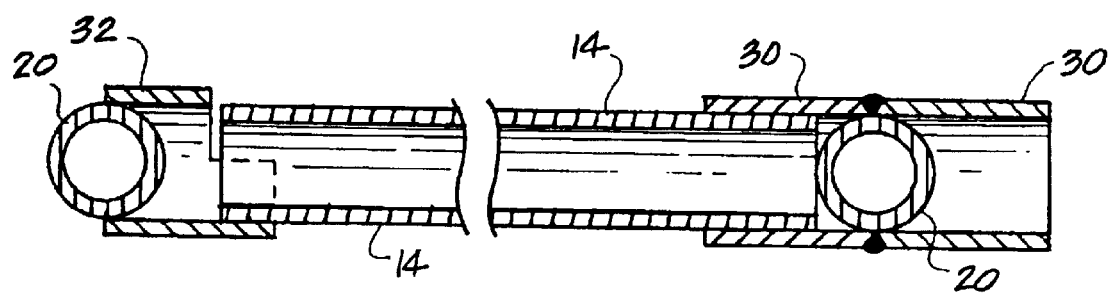
FIG. 12 is a longitudinal sectioned view of the purlin support nipples on opposite ends of a purlin.

Located between each pair of bows 12 and 12' in FIG. 1 are a series of purlins 14 which are tubes supported on each end by nipples 30 and 32. FIGS. 5, 6 and 7 illustrate the nipples in longitudinal section, the ends of which receive and support the five purlins supported by each bow 12. Nipple 32 includes an extension portion 33 which prevents the already positioned purlins from falling off the nipple as the remaining purlins are set in place. The purlin length is set so that the first end of the purlin is inserted in nipple 30, as shown in FIG. 12, up against horizontal tube 20 while the opposite end of the purlin just clears the notched out portion of nipple 32. Once the purlin is contained within both nipples 30 and 32, there is a degree of axial movement. However, the extension portion 32 is greater than that movement, thus preventing the purlin from falling out. The stake pockets 35 in which the bows are set have a fairly tight tolerance that prevents spreading the pair of bows 12 sufficiently to allow the purlin to fall off of extension 33.

Rafters 16, as seen in FIG. 1, are constructed from a flat steel strip having a sleeves 17 welded to their ends, as illustrated in FIG. 10. When assembling purlins 14, the two located at the outer ends of the horizontal section 20 must also be passed through sleeve 17 of rafter 16, as seen in FIG. 1. Once the truck top frame is assembled, as shown in FIG. 1, an extended strap, not shown in the drawings, is looped between the two outer bows, pulling all of the bows and purlins together, thus providing a tightly held overall unitary structure. The fabric cover, not shown, is straped to the truck's side walls 38, thus firmly holding overall frame 10 tightly assembled on the truck. The strap, not shown in the drawing, could be attached to the under side of the fabric top or it could be independent of the top. The extension nipple 32, as shown in FIG. 5, could also be located on the center bow 12' while the nipples 30 could be positioned on each end bow just as long as a pair of nipples which support a purlin include one with an extension portion 33, as shown in FIG. 5.

The foregoing detailed description is given primarily for clearness of understanding and no unnecessary limitations are to be understood therefrom for modifications can be made by those skilled in the art upon reading this disclosure and may be made without departing from the spirit of the invention and scope of the appended claims.

What is claimed is:

1. A truck top frame removably mountable on a cargo bed having stake pockets therein for support of a fabric cover comprising:

two or more bows mountable in the stake pockets;

a plurality of nipples mounted on each bow with said nipples facing two adjacent bows;

two or more purlins supported by the bows;

the bows further comprising at least three sections including two vertical sections, a horizontal section, and two non-rotating sliding joints therebetween, each vertical section includes an angled transitional section at its upper end and the horizontal section includes an angled transitional section at each end thereof, the transitional sections on the horizontal section join the transitional sections on the vertical section in a parallel telescoping relation in said two sliding non-rotating joints.

2. A truck top frame as set forth in claim 1 wherein the sliding joints between the sections comprise a reduced diameter pin fixed to one of the sections, which is telescopingly received in the joining section, the joining ends of each section have stepped mating cuts which when assembled, provide a non-rotatable joint.

3. A truck top frame as set forth in claim 1 wherein one of the sliding joints comprises a reduced diameter pin slidably mounted within the end of one of said sections with limited sliding movement between a retracted and an extended position.

4. A truck top frame as set forth in claim 1 wherein the bows adjacent each other include a nipple axially aligned with a nipple on the adjacent bow for receipt and support of said purlins, one of said two nipples supporting each perlin having a cutout upper portion for receipt and removal of the purlin end.

5. A truck top frame as set forth in claim 1 including at least two rafters positioned at (90°) ninety degrees with respect to the purlins and supported by the purlins through sleeves on the outer ends of the rafters.

6. A method of assembling and mounting the bows of a truck top frame by a single person in the cargo bed pockets of a truck comprising the steps of:

separately inserting the two bow vertical sections in their respective cargo bed stake pockets;

inserting one of the bow horizontal section's sliding joints into the mating sliding joint section of a first vertical section;

axially aligning the sliding joint sections of the opposite end of the horizontal section with the mating sliding joint section of the second vertical section with the sliding pin retracted; and, extending the reduced diameter sliding pin into the mating joint end of the second vertical section thereby providing an in-place assembled bow in its respective two cargo bed pockets.

7. A truck top frame removably mountable on a cargo bed having stake pockets therein for support of a fabric cover comprising:

two or more bows mountable in the stake pockets;

two or more purlins supported by the bows;

The bows further comprising at least three sections including two vertical sections, a horizontal section, and two non-rotating sliding joints therebetween, each vertical section includes an angled transitional section at its upper end and the horizontal section includes an angled transitional section at each end thereof, the transitional sections on the horizontal section join the transitional sections on the vertical section in a parallel telescoping relation in said two sliding non-rotating joints.

8. A truck top frame as set forth in claim 7 wherein one of the sliding joints comprises a reduced diameter pin slidably mounted within the end of one of said sections with limited sliding movement between a retracted and an extended position.

* * * * *